(12) United States Patent
Bouazizi

(10) Patent No.: US 8,463,858 B2
(45) Date of Patent: Jun. 11, 2013

(54) SYSTEM AND METHOD FOR BINDING NOTIFICATION TYPES TO APPLICATIONS FOR A NOTIFICATION FRAMEWORK

(75) Inventor: Imed Bouazizi, Tampere (FI)

(73) Assignee: Nokia Corporation (FI)

( * ) Notice: Subject to any disclaimer, the term of this patent is extended or adjusted under 35 U.S.C. 154(b) by 1185 days.

(21) Appl. No.: 12/348,258

(22) Filed: Jan. 2, 2009

(65) Prior Publication Data

US 2009/0181646 A1 Jul. 16, 2009

Related U.S. Application Data

(60) Provisional application No. 61/019,229, filed on Jan. 4, 2008.

(51) Int. Cl.
*G06F 15/16* (2006.01)
*H04M 3/493* (2006.01)

(52) U.S. Cl.
USPC ........................................ 709/206; 465/412.2

(58) Field of Classification Search
USPC ................ 709/201–202, 204–207; 455/412.2
See application file for complete search history.

(56) References Cited

U.S. PATENT DOCUMENTS

| | | | |
|---|---|---|---|
| 7,747,695 B1 * | 6/2010 | Morris et al. ................ | 709/206 |
| 8,055,284 B2 * | 11/2011 | Jeon et al. .................... | 455/466 |
| 8,103,264 B2 * | 1/2012 | Qumei et al. ................. | 455/418 |
| 2003/0106022 A1 * | 6/2003 | Goodacre et al. ............. | 715/513 |
| 2004/0054740 A1 * | 3/2004 | Daigle et al. ................. | 709/206 |
| 2006/0218586 A1 * | 9/2006 | Pohjolainen et al. .......... | 725/39 |
| 2007/0011244 A1 * | 1/2007 | O'Neal et al. ................ | 709/206 |
| 2007/0086465 A1 | 4/2007 | Paila et al. | |
| 2007/0207727 A1 * | 9/2007 | Song et al. ................... | 455/3.06 |
| 2007/0220558 A1 * | 9/2007 | Jung et al. .................... | 725/62 |
| 2008/0039008 A1 * | 2/2008 | Chen et al. ................... | 455/3.01 |
| 2008/0072258 A1 * | 3/2008 | Jeon et al. .................... | 725/48 |
| 2008/0155621 A1 * | 6/2008 | Jang et al. .................... | 725/105 |
| 2008/0207182 A1 * | 8/2008 | Maharajh et al. .......... | 455/414.1 |
| 2009/0132687 A1 * | 5/2009 | Yue et al. ..................... | 709/222 |

FOREIGN PATENT DOCUMENTS

WO WO-2007/023337 3/2007

OTHER PUBLICATIONS

IP Datacast over DVB-H, Dec. 2005, Digital Video Broadcasting, DVB Document A101, pp. 1-72.*
"Service Guide for Mobile Broadcast Services," Announcement Open Mobile Alliance,Mar. 24, 2006.
International Search Report for PCT Application No. PCT/IB2008/055604.
Michael Decker et al.,"A SME-Friendly framework for the provision of mobile services." Mobile Business, 2006. ICMB '06. International Conference on IEEE,Piscataway,New Jersey,Jun. 1, 2006. Phillip Steckel et al., "The Hybrid Java and XML-based MOBISERVE Rich Media middleware for DVB IP Datacast," Mobile and Wireless Communications Summit,Jul. 1, 2007.
Raimund Schatz et al.,"AMUSE-A Platform for Prototyping Live Mobile TV Services," Mobile and Wireless Communications Summit,Jul. 1, 2007.
Australian Patent Application No. 2008346173—Patent Examination Report No. 1, dated Dec. 10, 2012.

* cited by examiner

*Primary Examiner* — Chirag R Patel

(74) *Attorney, Agent, or Firm* — Banner & Witcoff, Ltd.

(57) ABSTRACT

A system and method for assigning notification type values. For dynamic notification types, a two-level mapping between the application and the notification type is performed. As a middle level or intermediary, a Multimedia Internet Message Extension (MIME) type for the notification messages is provided. The MIME type corresponds to the MIME type of the application-specific message part of the notification message. A pointer to a recommended notification application that can consume the messages of that specific type is also provided.

38 Claims, 7 Drawing Sheets

SYSTEM AND METHOD FOR BINDING NOTIFICATION TYPES TO APPLICATIONS FOR A NOTIFICATION FRAMEWORK

CROSS-REFERENCE TO RELATED PATENT APPLICATIONS

This application claims priority from U.S. Provisional Application 61/019,229, filed Jan. 4, 2008, incorporated herein by reference in its entirety.

FIELD OF THE INVENTION

The present invention relates generally to the use of notification applications within the context of notification frameworks. More particularly, the present invention relates to the mapping of notification messages to consuming applications within the context of a notification framework.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital Video Broadcasting Convergence of Broadcast and Mobile Services (DVB CBMS) is preparing a notification framework for Internet Protocol Datacast (IPDC) over Digital Video Broadcasting-Handheld (DVB-H). The notification framework will provide methods for carrying notification messages, informing a receiver of new events or triggering interactivity. The notification messages are to be carried over the broadcast channel DVB-H or over the interactivity channel (e.g., a 3G network). However, the notification framework is designed in a generic matter so as to be applicable to different types of notification applications.

Individual notification events are delivered in the form of notification messages. Notification messages can either be synchronized to audio/visual (A/V) content or they can comprise a stand-alone service. Synchronized notification messages describe events that are related to some A/V service, e.g. requests for voting or contextual advertisements. Standalone notification services carry notification messages that are grouped by certain criteria but are not related to an A/V service. An example of a standalone notification service is a stock market ticker that delivers share prices.

Notification services may be default or user-selected services. Default notification messages are of interest to all receivers and are therefore expected by receivers to be automatically received. An example of such a default notification service is an emergency notification service. On the other hand, user-selected notification messages are only received in response to a user selection or request to receive such message. Depending on the type of the notification service, the delivery of the notification messages may differ.

SUMMARY OF THE INVENTION

Various embodiments of the present invention provide a system and method for assigning notification type values. For dynamic notification types, a two-level mapping between the application and the notification type is performed. As a middle level or intermediary, a multimedia Internet Message Extension (MIME) type for the notification messages is provided. The MIME type corresponds to the MIME type of the application-specific message part of the notification message. A pointer to a recommended notification application that can consume the messages of that specific type is also provided.

Various embodiments enable the binding of notification messages to their consuming applications. The mapping can be either static or dynamic. In the case of dynamic mapping, flexibility is provided for the creation and deployment of various notification applications on top of the notification framework. Various embodiments may be used in conjunction with a variety of products that implement the notification framework in mobile TV devices, for example.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
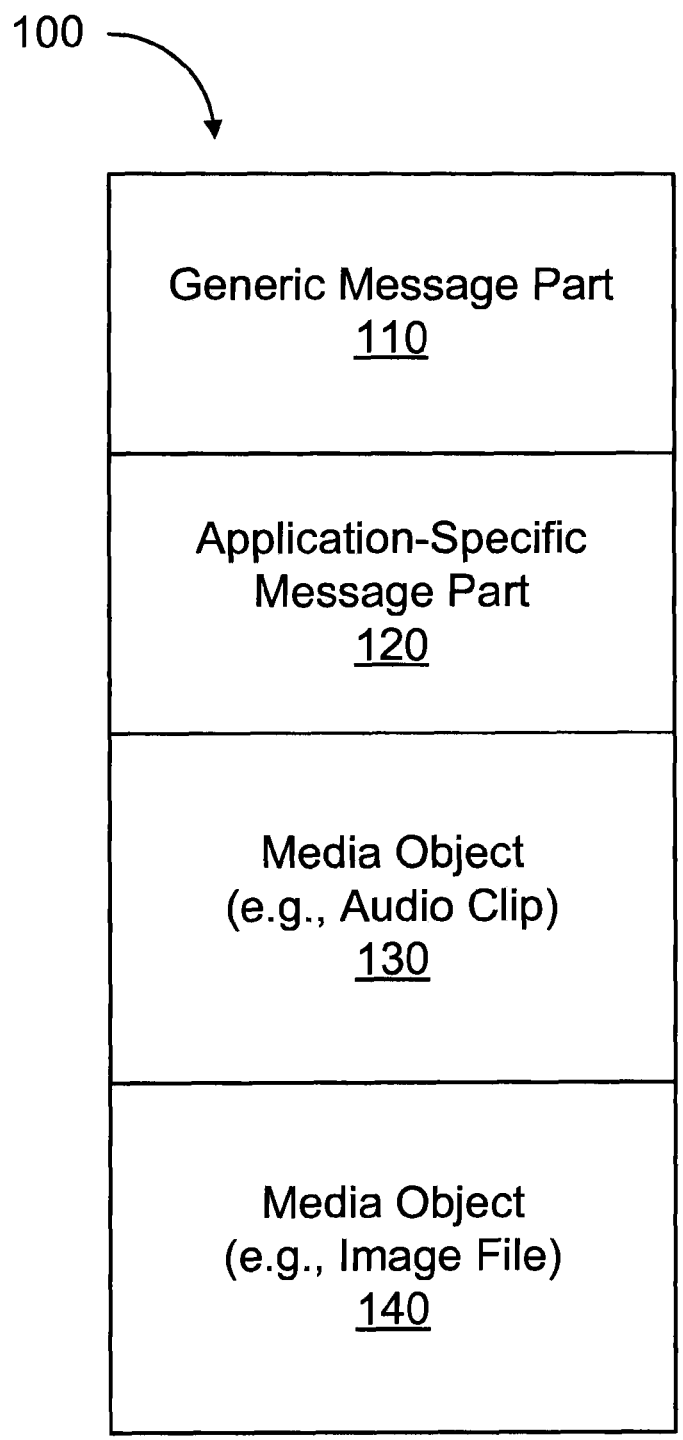
FIG. 1 is a general representation of the structure of a notification message.

FIG. 1 is a general representation of an exemplary structure of a notification message 100. Notification messages comprise three parts. First, a generic message part 110, e.g., an XML fragment, contains generic information about the notification message 100 and is consumed by the notification framework. Second, an application-specific message part 120 is a fragment (e.g., in an XML format) that contains the information used to describe the content of the notification message 100. The application-specific message part 120 is consumed by an application capable of processing the application-specific part 120 of the notification message 100. Finally, the third part of the notification message 100 comprises various media objects, such as audio clips 130 and image files 140. During the lifetime of an individual event, a corresponding notification message may be updated with different action commands to be performed by a receiver.

Two different transport protocols may be used for the delivery of notification messages over the (DVB-H) broadcast channel. File Delivery Over Unidirectional Transport (FLUTE) and Real-Time Transport Protocol (RTP). FLUTE is to be used for the delivery of unsynchronized and default notification messages. On the other hand, RTP is to be used primarily for the delivery of synchronized, service-related notification messages. Alternatively, a combination of RTP and FLUTE can be used, where the larger payload of a notification message (e.g., application-specific message part and media objects, if any) can be transported using FLUTE, while, e.g. only the generic message part of the notification message is delivered using RTP.

For RTP delivery, an RTP payload format header usually indicates the information that enables the correct processing and extraction of the notification message. The RTP payload format header may also allow the filtering of notification messages based on, e.g., their notification type. Additionally, the header usually provides the functionality for fragmentation and reassembly of notification messages that exceed the maximum transmission unit (MTU) size.

A similar extension to the File Delivery Table (FDT) of FLUTE also provides identification and fast access to information fields that are necessary for the selection of notification messages. The notification message parts may then be encapsulated and carried as a single transport object or as separate transport objects. The generic message part usually provides a list of the message parts that constitute the corresponding notification message. This enables the notification framework to retrieve all parts of a notification message and make them available to the consuming notification application. The references to the media objects and the description of the way to use them are usually provided by the application-specific message part. However, as the application-specific message part is not read by the notification framework, significant delays for reconstructing the notification message may occur if the notification framework is not aware of all the message parts to be retrieved.

Figure 2:
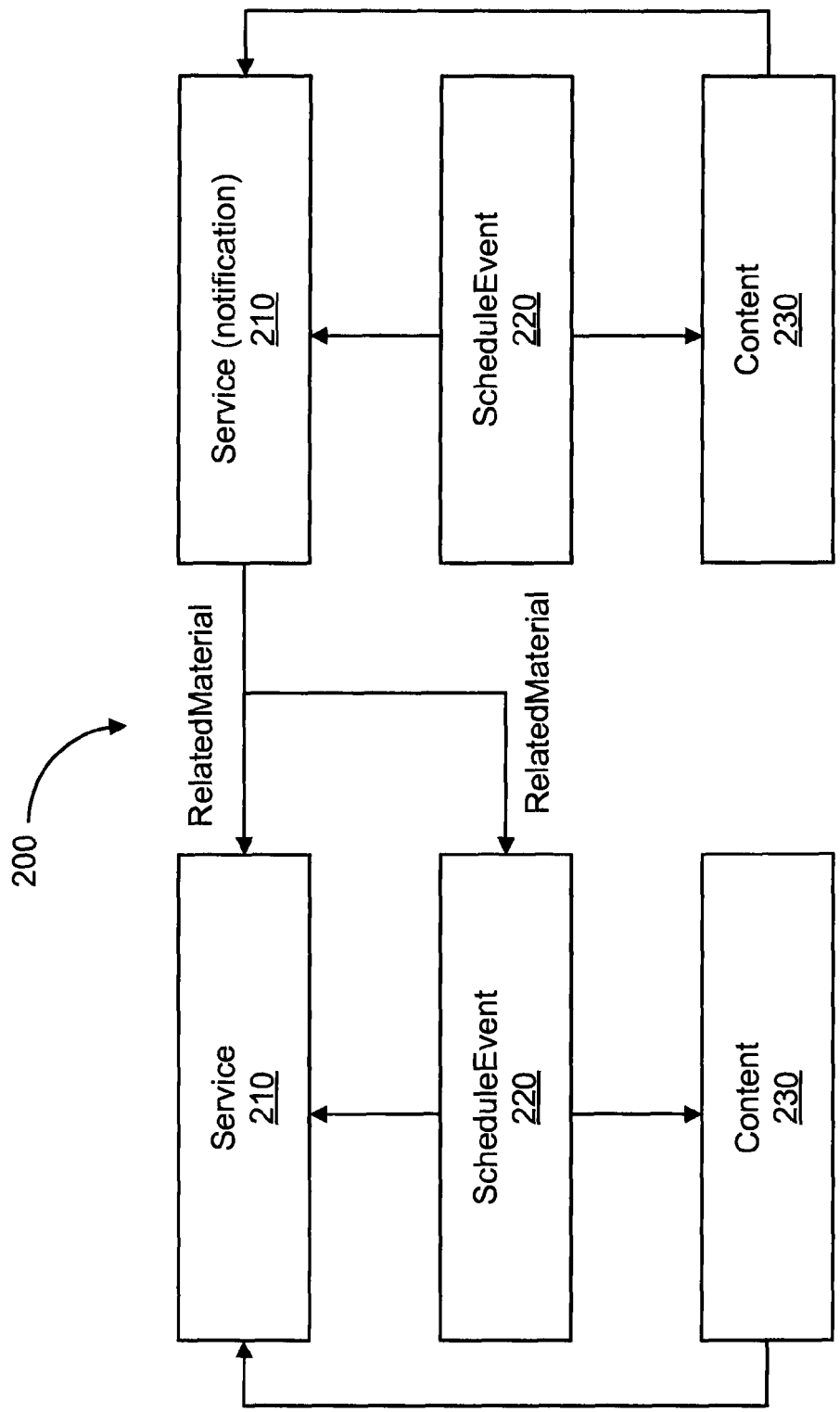
FIG. 2 is a representation of the modified ESG data model extension for notification signaling.

For user-selected notification messages, the signalling of the notification service (or a component of a service) is performed in the electronic service guide (ESG). The ESG data model is modified to enable the creation of notification service fragments and the related ScheduleEvent and Content fragments. The modified ESG data model 200 is depicted generally in FIG. 2, showing the relationships among notification service fragments 210, ScheduleEvent fragments 220 and Content fragments 230.

A notification application is identified by a unique Notification Type field. The notification type is used to identify a corresponding notification application that is intended to consume the notification messages of that type. The Notification Type field is carried in the message header as well as in the Service and Content fragments of the corresponding notification. The Notification Type field is also carried in the NotificationComponent description of the carrying session in the Access fragment. The Notification Type is used to indicate the type of the notification message. This information may be used to identify the target application for the notification message. A list of notification messages is maintained by DVB, with a range being reserved for dynamic notification messages.

The notification type information field is an 8-bit integer, which usually enables for the identification of up to 256 different notification applications at the same time. A subset of the range of notification type values is reserved for well defined (e.g., static) notification applications that are usually defined by DVB. An example of such a static notification application comprises an emergency notification service. The rest of the range of notification type values is reserved for dynamic values which cater for proprietary notification applications.

Figure 3:
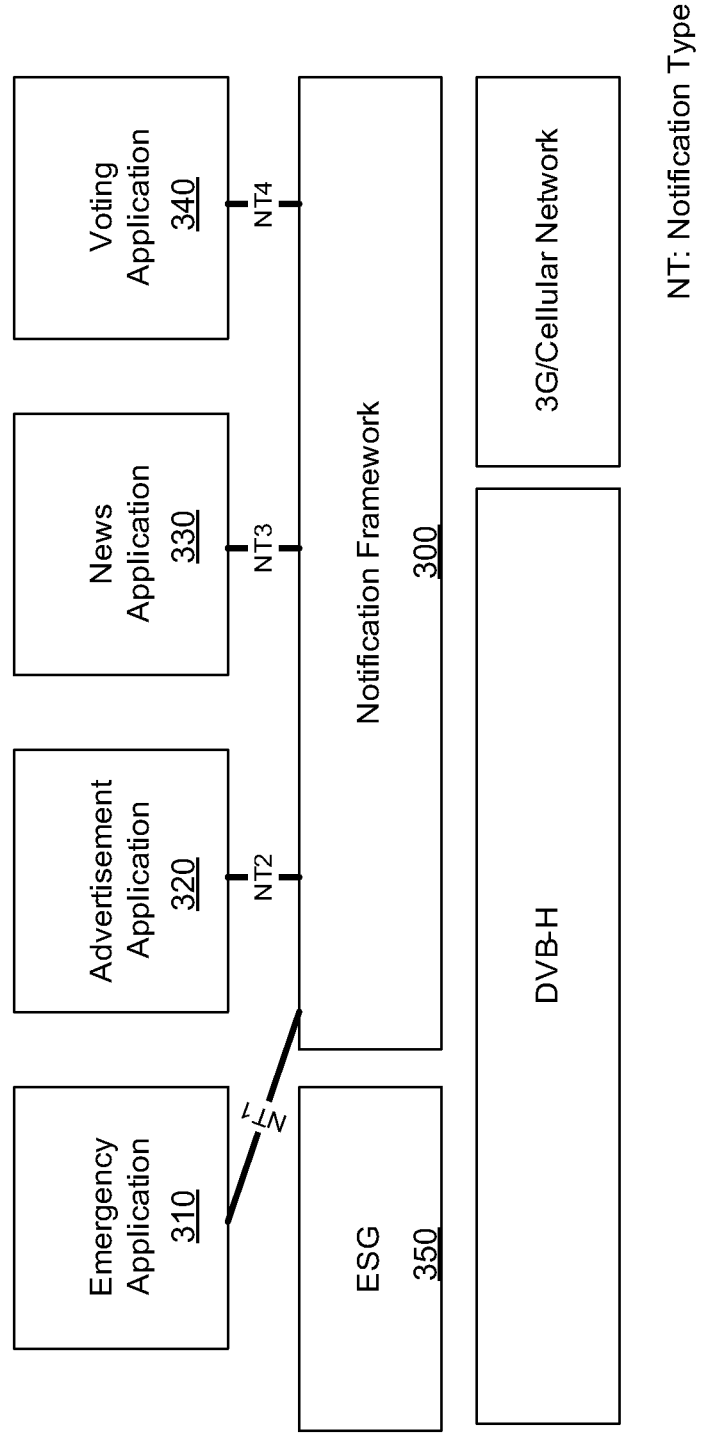
FIG. 3 is a representation of the conventional notification frame work and its relationship to various notification applications.

FIG. 3 depicts the notification framework 300 on the terminal side and its relationship to notification applications. In FIG. 3, the notification framework 300 uses different notification types (NT1-NT4) to communicate different notification messages to an emergency application 310, an advertisement application 320, a news application 330 and a voting application 340. Other types of applications are also possible.

For the assignment of notification types, there are a number of different requirements. For example, the notification framework must be capable of mapping the notification type to the corresponding notification application on the terminal side. The notification messages of that specific type are then forwarded by the notification framework to the consuming notification application. Additionally, the notification type must uniquely identify a notification application at least in the corresponding session (e.g., in the FLUTE or RTP session that carries the notification messages). On the other hand, the notification type must uniquely identify a notification application at all of the terminals, which means that the identification of the notification application should be possible for any notification service in the whole platform. Still further, because the consuming notification application may not be available at the terminal side, it should be possible to identify, locate and install the consuming application.

Various embodiments provide a system and method for assigning notification type values. For static notification types, such types usually have a fixed mapping. For dynamic notification types, a two-level mapping between the application and the notification type is performed. As a middle level or intermediary, a Multimedia Internet Message Extension (MIME) type for the notification messages is provided. The MIME type corresponds to the MIME type of the application-specific message part of the notification message. A pointer to a recommended notification application that can consume the messages of that specific type is also provided.

Various embodiments enable the binding of notification messages to their consuming applications. The mapping can be either static or dynamic. In the case of dynamic mapping, flexibility is provided for the creation and deployment of various notification applications on top of the notification framework. Various embodiments may be used in conjunction with a variety of products that implement the notification framework in mobile TV devices, for example.

An exemplary implementation of various embodiments of the present invention is generally as follows. The notification type is represented by an integer number. The notification type may take a value between 0 and 255. The notification type value range is divided into two parts. A first part is reserved for static mapping to notification applications. A second part is reserved for dynamic mapping to notification applications. The static mapping between notification type values and notification applications is defined by a static mapping of the MIME type of the application-specific part to the notification payload type. Devices may be provisioned by notification applications for the static notification type values. Those notification applications register with the notification framework on the terminal side as consumers for their corresponding notification types. The following shows an example of such an exemplary mapping table.

| Notification Type | MIME Type | Registered Application |
|---|---|---|
| 1 | application/vnd.dvb.notif.emergency+xml | Emergency.app |
| 2 | application/vnd.dvb.notif.network+xml | Network message app |

The format of the notification messages that have a static notification type may be defined by DVB. The network operator or the service provider may provision the devices with notification applications that consume one or more of the static notification types.

Dynamic notification message types may be used for identifying new notification applications and services that are service, operator, or user specific and therefore do not qualify for a static mapping. A new notification application defines an appropriate MIME type and an application-specific notification message part. Upon using a dynamic notification message type by a notification service, a dynamic notification type value is requested from the service operator. A unique value across the whole IP platform is then assigned to the requesting notification service.

According to another embodiment, the notification type may be scoped by the delivery channel in which the related notification messages are to be delivered. In such a case, the notification type is not supposed to be unique in the whole IP platform. Instead, the notification type only has to be unique within the carrying delivery channel. Since a delivery channel may be shared by multiple notification services, a request of the notification type from the service operator (e.g., the IP Platform operator) is still required.

Figure 4:
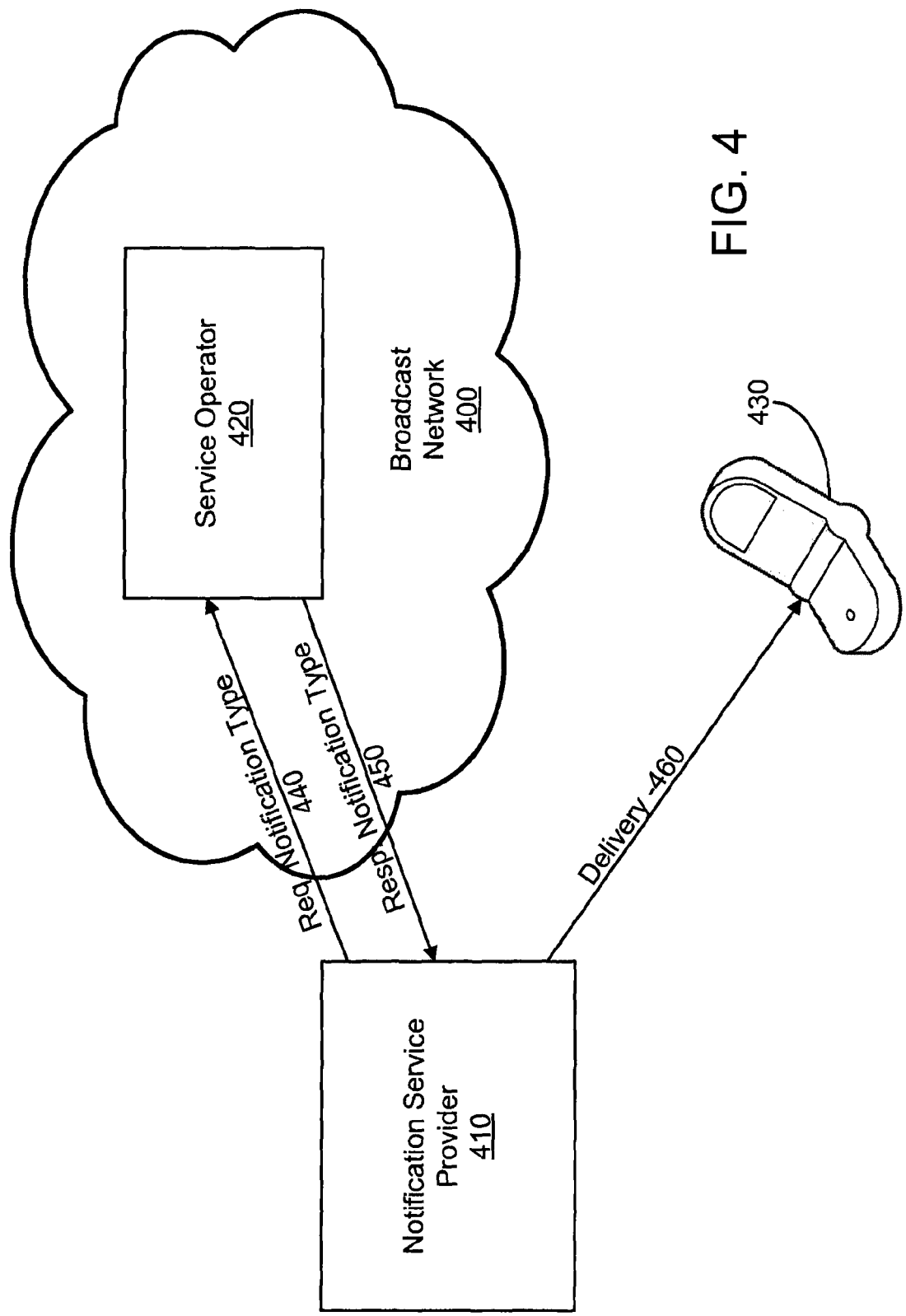
FIG. 4 shows the assignment of the notification type according to various embodiments.

FIG. 4 is a representation showing how a notification type may be mapped and assigned according to various embodiments. More particularly, FIG. 4 shows the interactions among a notification service provider 410, a service operator 420 operating within a broadcast network 400 and a terminal 430. At 440 in FIG. 4, when a notification service 410 is to provide notification messages to the terminal 430, the notification service 410 first sends a notification type request 440 to the service operator 420. At 450, the service operator 420 provides a response to the notification service provider 410, identifying a proper notification type. At 460, the notification service provider 410 uses the identified notification type to deliver the various notification messages to the terminal 430.

The mapping between the notification type field and the MIME type of the notification messages is performed depending on the type of the notification service. For example, if the notification service has a dynamic notification type and is carried over a default notification channel, the mapping may then be declared using the MIME type of the application-specific part. This mapping may be discovered upon the reception of the first notification message of that service by the terminal.

Default notification channels are usually based on FLUTE sessions. Depending on the type of delivery of the application-specific part of the notification message, the mapping may be discovered in different ways. If the application-specific part of the message is delivered separately in its own transport object, then the mapping may be established based on the MIME type indicated in the Content-Type field of the corresponding file type in the file delivery table (FDT). The notification type may be indicated in the extension element to the FDT, the NotificationMessageDescription. Alternatively, if the application-specific message part is delivered within a notification container, the notification container carries message parts of one or more notification messages, and the MIME type may then be indicated in the index part of the notification container or in the multipart/MIME part that carries the application-specific message part. The notification type may be either indicated in the FDT or discovered from the corresponding generic message part, which by itself usually has a reference to the application-specific notification message part. Additionally, an optional field may also be used to signal the notification type, with this optional field added to the index list structure. This enables the immediate detection of the notification type value without having to go through the generic message part. This extension may be included in the MessagePartType and may have the following form:

```
<xs:complexType name="MessagePartType">
    <xs:sequence>
        <xs:element name="FilterElementList" type="xs:base64Binary"
            minOccurs="0" maxOccurs="1"/>
        <xs:any namespace="##any" processContents="lax"/>
    </xs:sequence>
    <xs:attribute name="MessageID" type="xs:unsignedInt" use="optional"/>
    <xs:attribute name="Version" type="xs:unsignedByte" use="optional"
    <xs:attribute name="Content-ID" type="xs:anyURI" use="required"/>
    <xs:attribute name="Content-Position" type="xs:nonNegativeInteger"
use="optional"/>
    <xs:attribute name="Content-Type" type="xs:string" use="optional"/>
    <xs:attribute name="Content-Transfer-Encoding" type="xs:string"
use="optional"/>
    <xs:attribute name="Content-Description" type="xs:string" use="optional"/>
    <xs:attribute name="NotificationType" type="xs:unsignedInt" use="optional"/>
    <xs:anyAttribute namespace="##any" processContents="lax"/>
</xs:complexType>
```

The above extension allows for direct mapping between the MIME type of the application-specific message part as indicated by the Content-Type field and the notification type. Because the mapping is dynamic and may change over time in the default notification channel, the terminal must check and verify the mapping for each notification message it receives.

In the case of a user-selected notification message, the discovery of the mapping between the MIME type and the notification type value may be done in a different manner. The notification service is described in the ESG (depicted at 350 in FIG. 3). The channel that carries the notification messages is described by a NotificationComponent element, which indicates all of the notification types that are delivered over that channel. The mapping between MIME type and notification type may be accomplished through an extension to the NotifInitContRefType element, for example as follows:

```
<complexType name="NotificationComponentType">
    <complexcontent>
        <extension base="ComponentCharacteristicType"/>
            <sequence>
                <element name="NotificationComponentCat" type="integer">
                <element name="NotificationInitRef" type="NotifInitContRefType"
                    minOccurs="0" maxOccurs="unbounded">
                <element name="NotificationComponentIDRef" type="anyURI"
minOccurs="0">
            </sequence>
        </extension>
    </complexcontent>
</complexType>
<complexType name="NotifInitContRefType">
    <sequence>
        <element name="NotificationType" type="integer">
        <element name="ComponentIDRef" type="anyURI" minOccurs="0"/>
        <element name="ApplicationType" type="string" minOccurs="0"/>
        <element name="ContentLocation" type="anyURI" minOccurs="0"/>
</complexType>
```

One option for indicating the mapping between the MIME type and the notification type value comprises the notification initialization container. The notification initialization container carries information for initializing the notification framework and the consuming application for the processing of the corresponding notification messages. The notification initialization container is usually processed prior to the processing of the related notification messages.

Dynamic notification types may indicate a binding to a MIME type that has no registered consuming application. In such a case, the notification framework will not be able to process the received notification messages of that type. The notification service provider may instead indicate a link that allows the user to download a notification application that is able to consume the notification messages of the indicated notification type. The link may be included on one of several locations, including the generic message part, the notification initialization container and the ESG. The generic message part may be particularly suitable for notification messages delivered over default notification channels. The notification initialization container may be a generally suitable location for including the link to the application, as it is generally consumed by the notification framework prior to the consumption of any related notification messages. Lastly, the ESG may be suitable for user-selected notification applications. In such a situation, the pointer to the application may be included in the Content fragment or in the component characteristic of the notification component.

Figure 5:
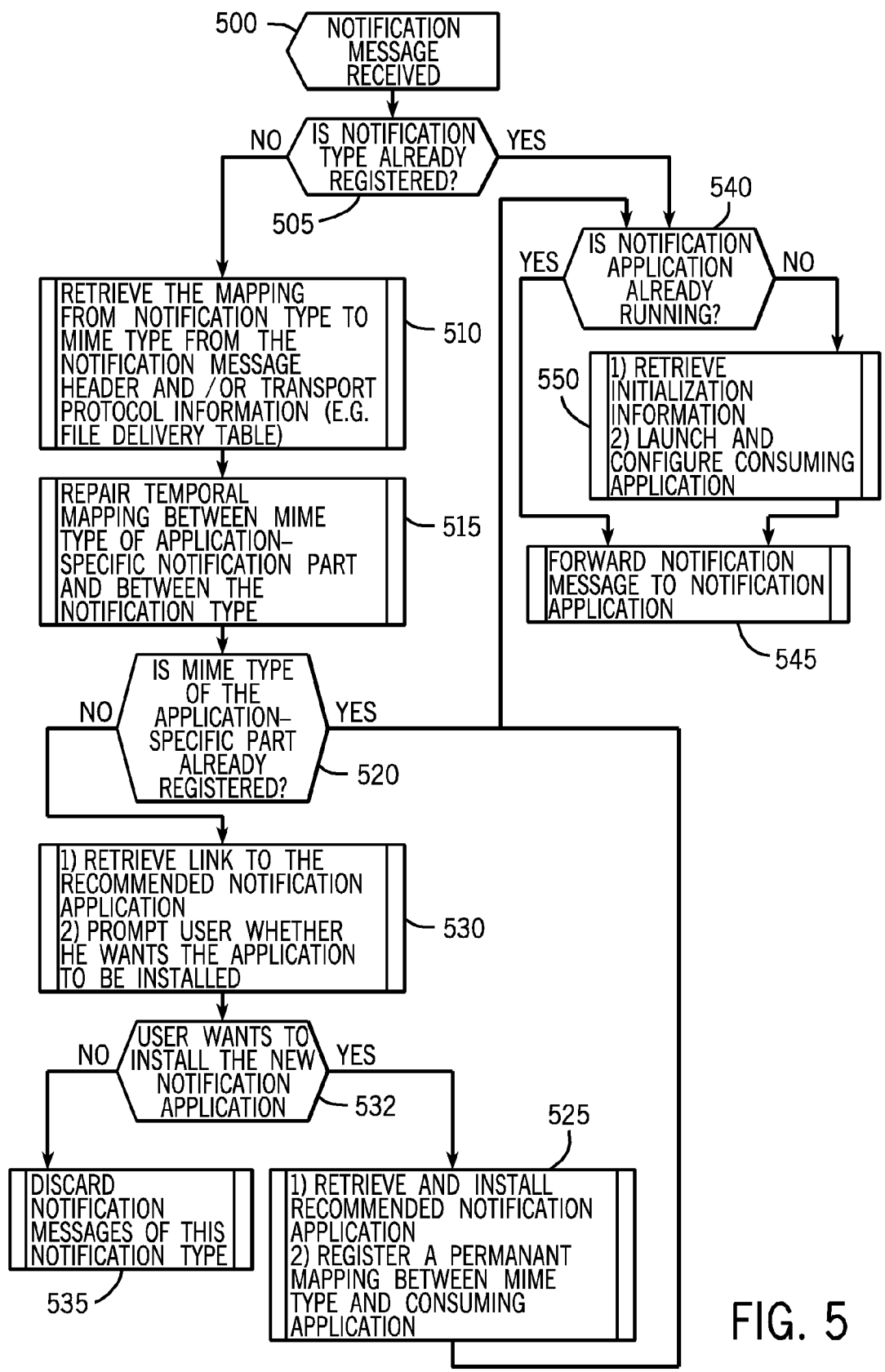
FIG. 5 is a flow chart showing an exemplary mapping process for notification type values on a receiver side.

FIG. 5 is a flow chart showing an exemplary mapping process for notification type values on a receiver side. At 500 in FIG. 5, a notification message is received. At 505, it is determined whether the notification type for the notification message is already registered. If not, then at 510 the mapping from the notification type to the MIME type is retrieved from the notification message header and/or transport protocol information such as the FDT. This is followed at 515 by registering temporal mapping between the MIME type of application-specification notification part and the notification type.

At 520, it is determined whether the MIME type of the application-specific part is already registered. If so, then, at 525, (1) the recommended notification application is retrieved and installed and (2) a permanent mapping between the MIME type and the consuming application is registered. It should be noted that these two processes, although depicted together at 525 in FIG. 5, may occur separately. If the MIME type of the application-specific part is not already registered, then at 530, (1) a link to the recommended notification application is retrieved and (2) the user is prompted as to whether he or she wants the notification application to be installed. Once again, these two processes may occur separately. The user's decision as to whether he or she wants the notification application to be installed is determined at 532. If the user wants the notification application to be installed, then the system runs to 525 discussed above. If, on the other hand, the user does not want to have the notification application installed, then at 535 notification messages of the particular notification type are simply discarded.

Returning to 505, if the notification type corresponding to the notification message is already registered, then it is determined at 540 whether the notification application is already running. (This also occurs after the process identified at 520 if the MIME type of the application-specific part is already registered). If the notification application is already running, then at 545, notification messages are forwarded to the notification application. If the notification application is not already running, then at 550, (1) initialization information is retrieved and (2) the consuming application is launched and configured, after which the process moves to 545. Again, these processes may occur separately even though they are depicted together in FIG. 5.

Figure 6:
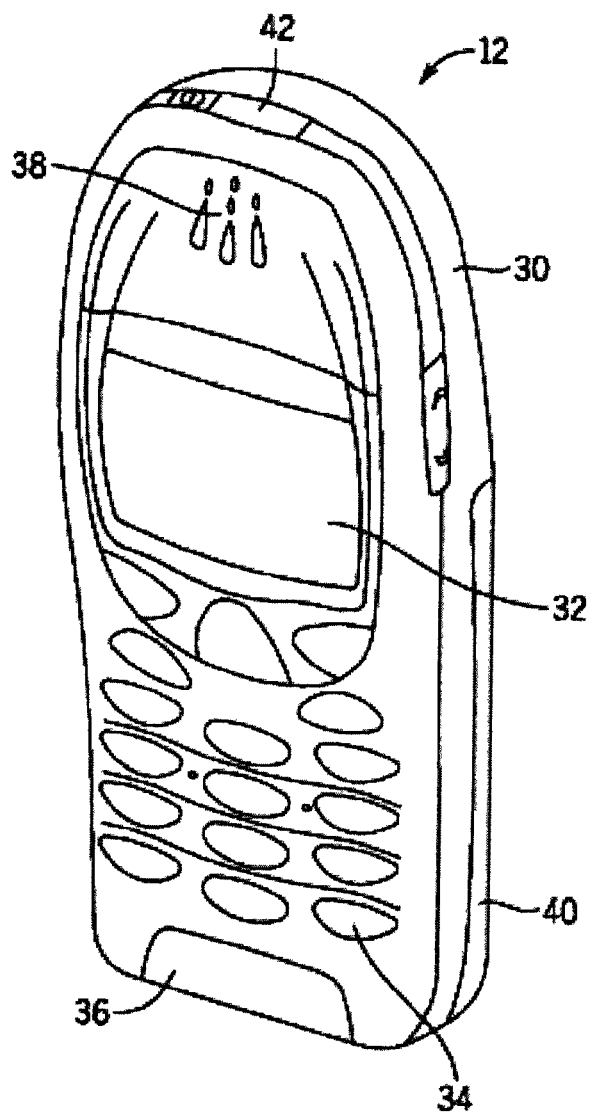
FIG. 6 is a perspective view of a mobile device that can be used in the implementation of the present invention.
Figure 7:
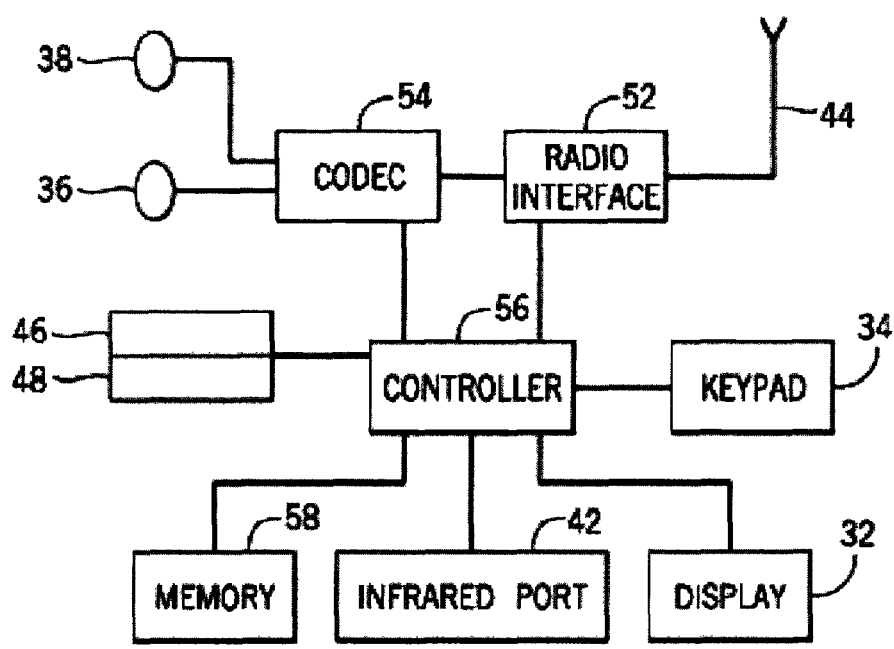
FIG. 7 is a schematic representation of the device circuitry of the mobile device of FIG. 6.

FIGS. 6 and 7 show one representative electronic device 12 within which various embodiments the present invention may be implemented. It should be understood, however, that the present invention is not intended to be limited to one particular type of device. The electronic device 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type known in the art. Some or all of the components depicted in FIGS. 5 and 6 may be included in any of the devices within which various embodiments of the present invention are implemented.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. By way of example, applications of various embodiments of the present invention are not limited to DVB-CBMS. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products. The features of the embodiments described herein may be combined in all possible combinations of methods, apparatus, computer program products and systems.

What is claimed is:

1. A method, comprising:
    mapping, by a computing device, a notification application to a notification type value using a Multimedia Internet Message Extension type for a notification message that is intended for consumption by the notification application, wherein the notification application does not qualify for static mapping; and
    assigning, by the computing device, the mapped notification type value to the corresponding notification application, wherein the assigned mapped notification type value is included in the notification message when transmitted to a terminal and intended for consumption by a notification framework;
    wherein the Multimedia Internet Message Extension type for the notification message corresponds to a Multimedia Internet Message Extension type for an application-specific part of the notification message.

2. The method of claim 1, wherein the mapping to the notification type value is unique to an entire Internet Protocol platform.

3. The method of claim 1, wherein the mapping to the notification type value is unique to a delivery channel within which the notification message is delivered.

4. The method of claim 1, wherein in response to the application-specific part of the notification message being delivered in its own transport object, the mapping of the notification application to the notification type value is based on a Multimedia Internet Message Extension type indicated in a Content-Type field of a corresponding file type of a file delivery table.

5. The method of claim 4, wherein the assigned mapped notification type value is indicated within an extension element to the file delivery table.

6. The method of claim 1, wherein in response to the application-specific part of the notification message being delivered within a notification container, the Multimedia Internet Message Extension type is indicated in one of an index part of the notification container and a multipart/Multimedia Internet Message Extension that carries the application-specific part of the notification message.

7. The method of claim 1, wherein the assigned mapped notification type value is indicated within a file delivery table.

8. The method of claim 1, wherein the assigned mapped notification type value is indicated via a generic message part of the notification message.

9. The method of claim 1, wherein the assigned mapped notification type value is indicated within an index list of the notification message.

10. The method of claim 1, wherein the assigned mapped notification type value is indicated within a notification initialization container.

11. The method of claim 1, wherein a link is transmitted to the terminal via which a user can download an application capable of consuming notification messages corresponding to the assigned mapped notification type value.

12. The method of claim 11, wherein the link is included in a generic message part of the notification message.

13. The method of claim 11, wherein the link is included in a notification initialization container.

14. The method of claim 11, wherein the link is included in an electronic service guide.

15. A non-transitory computer-readable storage medium, comprising computer code that, when executed, causes an apparatus at least to:
    map a notification application to a notification type value using a Multimedia Internet Message Extension type for a notification message that is intended for consumption by the notification application, wherein the notification application does not qualify for static mapping; and
    assign the mapped notification type value to the corresponding notification application, wherein the assigned mapped notification type value is included in the notification message when transmitted to a terminal and intended for consumption by a notification framework;

wherein the Multimedia Internet Message Extension type for the notification message corresponds to a Multimedia Internet Message Extension type for an application-specific part of the notification message.

16. The non-transitory computer-readable storage medium of claim 15, wherein the mapping to the notification type value is unique to an entire Internet Protocol platform.

17. The non-transitory computer-readable storage medium of claim 15, wherein the mapping to the notification type value is unique to a delivery channel within which the notification message is delivered.

18. The non-transitory computer-readable storage medium of claim 15, wherein in response to the application-specific part of the notification message being delivered in its own transport object, the mapping of the notification application to the notification type value is based on a Multimedia Internet Message Extension type indicated in a Content-Type field of a corresponding file type of a file delivery table.

19. The non-transitory computer-readable storage medium of claim 15, wherein in response to the application-specific part of the notification message being delivered within a notification container, the Multimedia Internet Message Extension type is indicated in one of an index part of the notification container and a multipart/Multimedia Internet Message Extension that carries the application-specific part of the notification message.

20. An apparatus, comprising:
a processor; and
a memory communicatively connected to the processor and storing computer code that, with the processor, cause the apparatus at least to:
map a notification application to a notification type value using a Multimedia Internet Message Extension type for a notification message that is intended for consumption by the notification application, wherein the notification application does not qualify for static mapping; and
assign the mapped notification type value to the corresponding notification application, wherein the assigned mapped notification type value is included in the notification message when transmitted to a terminal and intended for consumption by a notification framework;
wherein the Multimedia Internet Message Extension type for the notification message corresponds to a Multimedia Internet Message Extension type for an application-specific part of the notification message.

21. The apparatus of claim 20, wherein the mapping to the notification type value is unique to an entire Internet Protocol platform.

22. The apparatus of claim 20, wherein the mapping to the notification type value is unique to a delivery channel within which the notification message is delivered.

23. The apparatus of claim 20, wherein in response to the application-specific part of the notification message being delivered in its own transport object, the mapping of the notification application to the notification type value is based on a Multimedia Internet Message Extension type indicated in a Content-Type field of a corresponding file type of a file delivery table.

24. The apparatus of claim 23, wherein the assigned mapped notification type value is indicated within an extension element to the file delivery table.

25. The apparatus of claim 20, wherein in response to the application-specific part of the notification message being delivered within a notification container, the Multimedia Internet Message Extension type is indicated in one of an index part of the notification container and a multipart/Multimedia Internet Message Extension that carries the application-specific part of the notification message.

26. The apparatus of claim 20, wherein the assigned mapped notification type value is indicated within a file delivery table.

27. The apparatus of claim 20, wherein the assigned mapped notification type value is indicated via a generic message part of the notification message.

28. The apparatus of claim 20, wherein the assigned mapped notification type value is indicated within an index list of the notification message.

29. The apparatus of claim 20, wherein the assigned mapped notification type value is indicated within a notification initialization container.

30. The apparatus of claim 20, wherein a link is transmitted to the terminal via which a user can download an application capable of consuming notification messages corresponding to the assigned mapped notification type value.

31. The apparatus of claim 30, wherein the link is included in a generic message part of the notification message.

32. The apparatus of claim 30, wherein the link is included in a notification initialization container.

33. The apparatus of claim 30, wherein the link is included in an electronic service guide.

34. An apparatus, comprising:
means for mapping a notification application to a notification type value using a Multimedia Internet Message Extension type for a notification message that is intended for consumption by the notification application, wherein the notification application does not qualify for static mapping; and
means for assigning the mapped notification type value to the corresponding notification application, wherein the assigned mapped notification type value is included in the notification message when transmitted to a terminal and intended for consumption by a notification framework; and
wherein the Multimedia Internet Message Extension type for the notification message corresponds to a Multimedia Internet Message Extension type for an application-specific part of the notification message.

35. The apparatus of claim 34, wherein the mapping to the notification type value is unique to an entire Internet Protocol platform.

36. The apparatus of claim 34, wherein the mapping to the notification type value is unique to a delivery channel within which the notification message is delivered.

37. The apparatus of claim 34, wherein in response to the application-specific part of the notification message being delivered in its own transport object, the mapping of the notification application to the notification type value is based on a Multimedia Internet Message Extension type indicated in a Content-Type field of a corresponding file type of a file delivery table.

38. The apparatus of claim 34, wherein in response to the application-specific part of the notification message being delivered within a notification container, the Multimedia Internet Message Extension type is indicated in one of an index part of the notification container and a multipart/Multimedia Internet Message Extension that carries the application-specific part of the notification message.

* * * * *